United States Patent [19]

Heimbigner

[11] 3,746,882

[45] July 17, 1973

[54] INPUT SYNCHRONIZER CIRCUIT

[75] Inventor: Gary L. Heimbigner, Anaheim, Calif.

[73] Assignee: North American Rockwell Corporation, El Segando, Calif.

[22] Filed: July 2, 1971

[21] Appl. No.: 159,556

Related U.S. Application Data

[62] Division of Ser. No. 884,525, Dec. 12, 1969, abandoned.

[52] U.S. Cl. .................................. 307/205, 307/251

[51] Int. Cl. .............................................. H03k 19/08

[58] Field of Search .................... 307/231, 207, 208, 307/206, 215, 118, 269, 205; 328/151, 175, 92

[56] References Cited

UNITED STATES PATENTS

| | | | |
|---|---|---|---|
| 3,510,787 | 5/1970 | Pound | 307/208 |
| 3,092,729 | 6/1963 | Cray | 307/218 |
| 3,075,089 | 1/1963 | Maley | 307/215 |

OTHER PUBLICATIONS

Lode, "Realization of Universal Computing Element," JCS, 6/1952, p. 521.

Goodell, "The Foundations of Computing Machinery" Journal of Computing Systems Page 97 Jan 1953.

S. H. Washburn, "An Application of Boolean Algebra to the Designs of Switching Circuits[ AIEE Transactions Vol. 72 Pages 384–385.

Sevin "Field Effect Transistors" Texas Ins. Electronics Series 1965 Page 122.

*Primary Examiner*—John W. Huckert
*Assistant Examiner*—R. E. Hart
*Attorney*—Robert G. Rogers

[57] ABSTRACT

A field effect transistor is turned on by a clock signal for sampling an input signal. A voltage level representing the input signal is processed through the synchronizer circuit and appears at the output. A signal representing the inverted output is fed back through a logic gate which also receives the clock signal. The feedback signal holds the output in a good logic state until the input is changed during a subsequent sampling time.

3 Claims, 3 Drawing Figures

*INVENTOR.*
GARY L. HEIMBIGNER

*BY* Robert G. Rogers
ATTORNEY

INVENTOR.
GARY L. HEIMBIGNER

BY Robert G. Rogers
ATTORNEY

INPUT SYNCHRONIZER CIRCUIT

This is a divisional application of Application Ser. No. 884,525, filed Dec. 12, 1969 for Input Synchronizer Circuit, by Gary L. Heimbinger now abandoned.

BACKGROUND OF THE INVENTION

1. Field of the Invention

The invention relates to an input synchronizer circuit and, more particularly, to such a circuit in which a feedback signal is used to maintain the output at a signal level which correctly represents the input signal.

2. Description of Prior Art

It is well known that asynchronous inputs to sample and hold circuits, if sampled during a transition from, for example, a logic zero state to a logic one state, can result in a stored output that has a voltage level between the two logic states. As a result, that output signal may be interpreted differently by other receiving circuits. For example, if the stored output is −6 volts, certain receiving circuits may not be actuated by the 6 volts. As a result, the receiving circuits would indicate that a logic zero was sampled at the original input. Other circuits may interpret the 6 volts as a logic one.

Therefore, some means should be provided to insure that regardless of the sampling time during a transition, the stored output accurately reflects the logic state of the input signal. The means should also prevent any change in the output until the next sampling time. The present invention provides a circuit for properly synchronizing input and output signals so that the output accurately represents the input.

SUMMARY OF THE INVENTION

Briefly, the invention comprises a first logic gate for receiving an input signal and a clock signal. The input signal is sampled and inverted through the first gate to provide an input to a second gate. The second gate also receives an input from a third gate which is gated simultaneously with the first gate by the clock signal. The sampled and inverted input signal is reinverted and gated through the second gate to an output. The output signal is inverted through an inverter gate to provide a second input to the third gate. After the clock signal is turned off, or becomes false, the signal on the output is stored, or held, at its original voltage level.

Therefore, it is an object of this invention to provide an improved circuit for synchronizing an input signal with the output signal.

It is another object of this invention to provide a circuit for storing an output signal which accurately represents an input signal even if the signal is sampled during a transition from one logic state to another logic state.

A still further object of this invention is to provide an input synchronizer circuit having a DC regeneration loop between the input sampling gate and an output which forces the output to a voltage level correctly representing the logic state of the input signal.

A further object of the invention is to provide a sample and hold logic circuit having a regeneration loop for eliminating any ambiguous outputs other than during the sampling interval.

A further object of this invention is to provide a sample and hold logic circuit implemented by field effect transistors using feed back for forcing the circuit to generate an output which accurately represents an input signal even if the circuit samples the input signal during a transition between logic states.

These and other objects of this invention will become more apparent when taken in connection with the description of the drawings, a brief description of which follows:

DESCRIPTION OF PREFERRED EMBODIMENT

Figure 1:
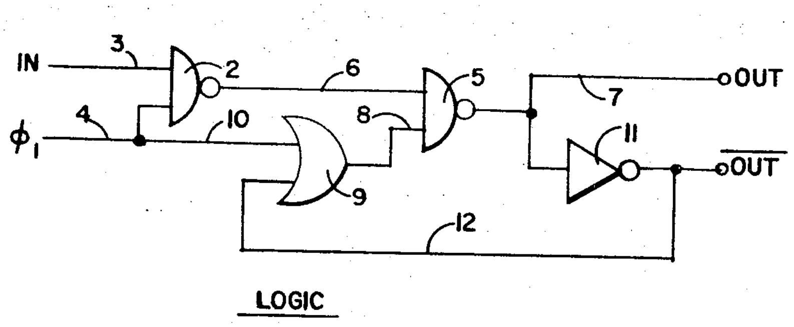
FIG. 1 is a logic diagram of one embodiment of the input synchronizer circuit.

FIG. 1 is a logic diagram of input synchronizer circuit 1 comprising NAND gate 2 which receives an input signal on line 3 and a clock signal on line 4. The NAND gate 2 provides an input to NAND gate 5 on line 6. NAND gate 5 provides the output (OUT) from the circuit on line 7. NAND gate 5 also receives an input signal on line 8 from OR gate 9. The combination of OR gate 9 and NAND gate 5 implements a NOR gate.

OR gate 9 receives one input signal on line 10 from the clock signal $\phi_1$. the other input to the OR gate is the inverted output signal ($\overline{OUT}$) which is generated by inverter 11. Inverter 11 receives the OUT signal and inverts it. As a result, an $\overline{OUT}$ signal appears as an input to OR gate 9 on line 12.

In operation, when the input and clock signals appearing on lines 3 and 4, respectively, are high (true), the ouput from NAND gate 2 is low. Any low (false) signal an NAND gate 5 results in a high output. Therefore, if the input on line 3 is true during the sampling period, i.e. when the clock signal $\phi_1$ is true, the output on line 7 is also ture. The true output signal is inverted through inverter 11 to provide a low input to OR gate 9.

Since $\overline{OUT}$ is low, OR gate 9 is controlled by the clock signal $\phi_1$. During the sampling period, the clock signal $\phi_1$ is high and the output from OR gate 9 on line 8 is high. At the end of the sampling period, the clock signal $\phi_1$ becomes flase so that OR gate 9 is controlled by the signal on line 12. However, for a high input on line 3, the $\overline{OUT}$ signal is low. As a result, OR gate 9 receives two low (false) signals after the sampling period. Since neither signal is true, the output is false or low. Therefore, regardless of the logic state of the signal on line 6, the output from NAND gate 5 is high. The high output is therefore stored on line 7 until the next sampling time.

If the input is false during the sampling period, the output from NAND gate 2 on line 6 is high. The output from OR gate 9 is also high since on clock signal is true during the sampling period. As a result, two high inputs into NAND gate 5 result in a low output on line 7. The low output is inverted through inverter 11 to provide a high input true. OR gate 9. The high input to OR gate 9 results in a high output on line 8 after the sampling period. The high output on line 8, coupled with the high signal on line 6, forces the output on line 7 to be stored as a logic zero.

The circuit loop comprising inverter 11, line 12, OR gate 9, and line 8 may be referred to as a DC regeneration loop. The DC regeneration loop forces the circuit output on line 7 to a voltage level representing an accurate logic one or an accurate logic zero for eliminating ambiguous outputs from the circuit except during the sampling time. Following the sampling time, the output is controlled by the DC regeneration loop.

Figure 2:
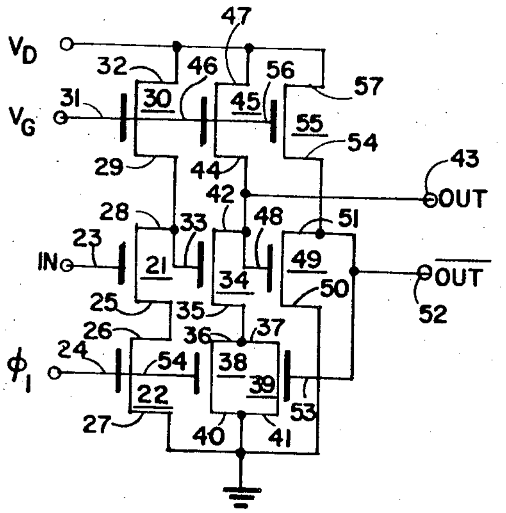
FIG. 2 is a schematic diagram of the FIG. 1 circuit implemented by field effect transistors.

FIG. 2 is a schematic illustration of the FIG. 1 embodiment implemented by field effect transistors. Field effect transistor 21 and field effect transistor 22 receive an input signal and a clock signal $\phi_1$ on their gate electrodes 23 and 24, respectively. Source electrode 25 of transistor 21 is connected to drain electrode 26 of transistor 22. Source electrode 27 of transistor 22 is connected to electrical ground. Drain electrode 28 of transistor 21 is connected to source electrode 29 of transistor 30 which has its gate electrode 31 connected to control voltage, $V_g$, and its drain electrode 32 connected to bias voltage, $V_d$.

Drain electrode 28 of transistor 21 is also connected to gate electrode 33 of field effect transistor 34. Source electrode 35 of transistor 34 is connected to the common connection between drain electrodes 36 and 37 of field effect transistors 38 and 39. The source electrodes 40 and 41 of field effect transistors 38 and 39 are connected at a common point to electrical ground.

Drain electrode 42 of transistor 34 is connected to output terminal 43 (OUT) and to source electrode 44 of field effect transistor 45. Transistor 45 has its gate electrode 46 connected to control voltage, $V_g$, and its drain electrode 47 connected to bias voltage, $V_d$.

Drain electrode 42 of transistor 34 is also connected to gate electrode 48 of field effect transistor 49. The source electrode 50 of transistor 49 is connected to electrical ground. The drain electrode 51 of transistor 49 is connected to the inverted output terminal 52 ($\overline{\text{OUT}}$) and to gate electrode 53 of transistor 39. Gate electrode 54 of transistor 38, connected in parallel with transistor 39, is connected to the clock signal $\phi_1$.

In addition, drain electrode 51 of transistor 49 is connected to source electrode 54 of field effect transistor 55. Transistor 55 has its gate electrode 56 connected to control voltage, $V_g$, and its drain electrode 57 connected to bias voltage $V_d$.

Figure 3:
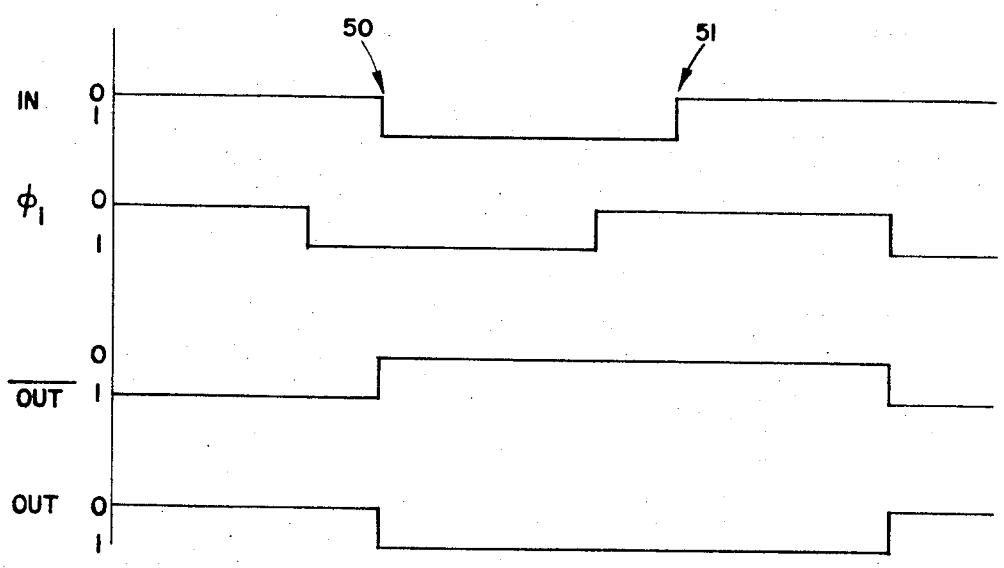
FIG. 3 is a diagram of the signals at the inputs and outputs of the FIG. 1 and FIG. 2 circuits.

The operation of the circuit can best be seen by referring to FIGS. 2 and 3. During the sampling period, clock signal $\phi_1$ becomes true. As shown in FIG. 3, the operation of the circuit is synchronized so that the clock signal is true during the data period indicated by the numeral 50 in FIG. 3. As the input signal changes from a logic zero to a logic one, field effect transistor 21 becomes conductive. Since clock signal $\phi_1$ was already true, field effect transistor 22 was already conductive.

As a result, a signal near to electrical ground appears on the drain electrode 28 of transistor 21 and gate electrode 33 of transistor 34. In other words, the high input signal to transistor 21 is inverted to provide a low input to transistor 34. Although the clock signal turns transistor 38 on, the low signal on gate electrode 33 holds transistor 34 off. Since transistor 35 is turned on by $V_g$, the $V_d$ voltage level appears on the output terminal 43 (assuming that $V_g$ is more negative than $V_d$ by a threshold drop).

Due to the switching time requirements of the transistors, it may be possible during a transition period to have an output indication between logic one and logic zero. However, at the end of a sampling period, the output voltage level becomes stable at approximately $V_d$, or electrical ground, as a function of the input signal level.

If the input is a logic one when the clock signal becomes false after the sampling period, transistors 38 and 39 are turned off. Transistor 39 is held off by the feedback $\overline{\text{OUT}}$. If the input is a logic zero, the true output $\overline{\text{OUT}}$ holds transistor 39 on so that the output stores a voltage level representing a false output.

During the next sampling interval, suppose that the input data had changed from a logic one to a logic zero, as shown by numeral 51. If that occurs, transistor 21 is turned off and transistor 34 becomes conductive. Since transistor 38 is also conductive during the sampling period, the output is forced to electrical ground. Transistor 49 becomes non-conductive so that the $V_d$ voltage is fed back to the gate electrode 53 of transistor 39. Therefore, transistor 35 is held on after the sampling period, and the output is forced to represent a logic zero state regardless of a change in the input signal until the next sampling period.

Because of the loop gain of the circuit, an in-between logic condition, either logic one or logic zero, is unstable. The circuit is thus forced into a good logic state after the sampling period. During the time the output is stable, it may be used to provide an input signal to other receiving circuits.

It is pointed out that the circuit may be implemented by P or N channel MOS devices and by other field effect transistors such as MNOS devices. The $V_d$ and $V_g$ voltages may be identical. In certain circuit embodiments, $V_d$ and $V_g$ voltages may be implemented by a clock signal synchronized with the $\phi_1$ signal. The transistors 30, 45, and 55 may be produced with different conductances since all three transistors may be required to provide different amounts of load current. Although a $\phi_1$ clock signal is shown, it should be understood that various sampling clocks may be used with the circuit so long as the clock signal is off when the output of the circuit is being used, or intergated, by other circuits.

I claim:

1. A synchronizer circuit comprising, a plurality of field effect transistors, each of said field effect transistors having a conduction path between a source electrode and a drain electrode, each of said field effect transistors having a gate electrode for controlling conduction through said conduction path, first source means for supplying a first voltage level, second source means for supplying a second voltage level, first, second and third field effect transistors having the conduction paths thereof connected in electrical series between said first and second source means in order to receive the respective voltage levels, first means providing a data input signal to the control electrode of the second field effect transistor, fourth, fifth and sixth field effect transistors having the conduction paths thereof connected in electrical series between said first and second source means in order to receive the respective voltage levels, second means providing a data sampling signal to the control electrode of each of said first and fourth field effect transistors, the control electrode of said fifth field effect transistor connected at a common point of the conduction paths of said second and third field effect transistors, a first output terminal connected to a common point of the conduction paths of said fifth and sixth field effect transistors to produce an output signal, a seventh field effect transistor having the conduction path thereof connected in electrical parallel with the conduction path of said fourth field effect transistor, eighth and ninth field effect transistors having the conduction paths thereof connected in electrical series between said first and second source means in order to receive the respective voltage levels, the control electrode of said eighth field effect transistor connected to a common point of the conduction paths of said fifth and sixth field effect transistors, a second output terminal connected to a common point of the conduction paths of said eighth and ninth field effect transistors to produce an inverted output signal relative to the output signal at said first output terminal, the control electrode of said seventh field effect transistor connected to said second output terminal to receive said inverted output signal, and third means providing control signals to the control electrode of said third, sixth and ninth field effect transistors.

2. The synchronizer circuit recited in claim 1 wherein said second means provides a data sampling signal of the same phase to the control electrode of each of said first and fourth field effect transistors.

3. The synchronizer circuit recited in claim 1 wherein said third means is connected to receive one of said first and second voltage levels from the first or second source means.

* * * * *

PO-1050
(5/69)

UNITED STATES PATENT OFFICE
CERTIFICATE OF CORRECTION

Patent No. 3,746,882 Dated July 17, 1973

Inventor(s) Gary L. Heimbigner

It is certified that error appears in the above-identified patent and that said Letters Patent are hereby corrected as shown below:

Column 2, line 32, change "an" to --on--.

line 35, change "ture" to --true--.

line 42, change "flase" to --false--.

line 53, change "on" to --the--.

line 57, change "true." to --to--.

Column 4, line 6, change "output" to --input--.

Signed and sealed this 18th day of December 1973.

(SEAL)
Attest:

EDWARD M. FLETCHER, JR.
Attesting Officer

RENE D. TEGTMEYER
Acting Commissioner of Patents